US007231355B2

(12) United States Patent
Schoen et al.

(10) Patent No.: US 7,231,355 B2
(45) Date of Patent: Jun. 12, 2007

(54) METHOD AND APPARATUS FOR CORRELATING AND TRACKING PASSENGERS AND BAGGAGE FOR A TRACKABLE PASSENGER TRIP

(75) Inventors: Marc L. Schoen, Redmond, WA (US); Stephen L. M. Hockaday, Port Hadlock, WA (US)

(73) Assignee: The Boeing Company, Chicago, IL (US)

( * ) Notice: Subject to any disclaimer, the term of this patent is extended or adjusted under 35 U.S.C. 154(b) by 240 days.

(21) Appl. No.: 10/313,956

(22) Filed: Dec. 6, 2002

(65) Prior Publication Data

US 2004/0111279 A1 Jun. 10, 2004

(51) Int. Cl.
*G06Q 99/00* (2006.01)
(52) U.S. Cl. .......................................................... 705/1
(58) Field of Classification Search ..................... 705/1
See application file for complete search history.

(56) References Cited

U.S. PATENT DOCUMENTS

| 6,085,976 | A | 7/2000 | Sehr |
| 6,158,658 | A * | 12/2000 | Barclay ........................ 235/384 |
| 6,222,452 | B1 * | 4/2001 | Ahlstrom et al. ........... 340/572.1 |
| 6,377,210 | B1 * | 4/2002 | Moore ..................... 342/357.13 |
| 6,509,829 | B1 * | 1/2003 | Tuttle ........................... 340/10.1 |
| 6,512,964 | B1 * | 1/2003 | Quackenbush et al. ....... 700/226 |
| 6,624,752 | B2 * | 9/2003 | Klitsgaard et al. ......... 340/572.1 |
| 6,738,712 | B1 | 5/2004 | Hildebrant |
| 6,753,808 | B2 * | 6/2004 | Lee et al. ................. 342/357.07 |
| 6,970,088 | B2 * | 11/2005 | Kovach ..................... 340/572.1 |
| 2003/0167240 | A1 * | 9/2003 | Napier et al. ................. 705/404 |
| 2003/0233244 | A1 * | 12/2003 | Kumhyr ........................... 705/1 |
| 2004/0098276 | A1 * | 5/2004 | Blazey et al. ................... 705/1 |
| 2004/0199403 | A1 * | 10/2004 | Ananda .......................... 705/1 |

FOREIGN PATENT DOCUMENTS

WO    WO 9936798 A2 *  7/1999

OTHER PUBLICATIONS

PR Newswire, Sabre and BlueTags Form Partnership to Create Unique eBaggage Tracking Solution, Mar. 26, 2001, PR Newswire, New York, p. 1.*
PCT International Search Report, John Weiss, Nov. 18, 2004 (4 pgs).

* cited by examiner

*Primary Examiner*—Jamisue A. Plucinski
(74) *Attorney, Agent, or Firm*—Harness, Dickey & Pierce, P.L.C.

(57) ABSTRACT

A system and method track both passenger and baggage during passenger trips, improving trip security, reducing lost baggage, allowing remote baggage check-in and retrieval, and allowing billing and financial transactions among system users. A passenger identification code (PIC) identifies a passenger, a trip starting location, and both a carrier and a final destination. A baggage identification code (BIC) is assigned to each piece of a trackable baggage set. At the trip starting location the PIC and BIC are wirelessly transmitted to an integrated travel information system (ITIS) using a wireless electronic device (WED). At a trip segment end the ITIS locates the baggage set and directs it to a transportation vehicle located by the ITIS. The ITIS directs the passenger to the transportation vehicle via a WED message. The WED transmits an end-of-trip signal to the ITIS at the final destination.

9 Claims, 8 Drawing Sheets

METHOD AND APPARATUS FOR CORRELATING AND TRACKING PASSENGERS AND BAGGAGE FOR A TRACKABLE PASSENGER TRIP

FIELD OF THE INVENTION

The present invention relates to transportation systems and more specifically to a system and method to correlate a traveler to the traveler's baggage and track both over the course of a passenger trip.

BACKGROUND OF THE INVENTION

Passenger air transportation is generally viewed as a trip commencing at one airport and ending at another airport. Passengers generally check-in at the departure airport ticket counter or gate and check-in their baggage as well at the departure airport. A disadvantage of this system is that the passenger with all of the passenger's baggage is concentrated with a plurality of other passengers and their baggage into a finite quantity of check-in areas, and the time required to check-in travelers with their baggage increases with increasing passenger numbers. Passengers are often uninformed about changes to their flights, and airlines are unaware of passenger progress towards their flight. Security problems also exist, in part because it is difficult to ensure that bags are matched with the passenger on the aircraft, and passengers may also carry to the aircraft a greater volume of baggage in order to avoid having to check-in baggage with the airlines. Using carry-on baggage has its own drawbacks in that carry-on baggage has its own screening needs, consumes space within the aircraft in the overhead compartments and under the seating areas, and delays passenger loading.

The airlines are also forced to deal with all aircraft checked baggage at the point of entry into the system, i.e., either at the curb-side check-in point or at the check-in terminal counters. This places the full burden of identifying, logging in and security checking each piece of baggage at the airport terminal. At the arrivals area of the terminal, passengers crowd into limited area baggage pickup zones to retrieve their baggage.

A need therefore exists for a system which provides improved service to the passenger, reduces the congestion from passenger and baggage processing at departure terminals, provides better information to passengers and airlines, and facilitates security screening. A need also exists to improve the baggage pickup and passenger arrival coordination portions of a trip to reduce the congestion and security concerns at arrival terminals. The opportunity also exists to provide added value to the passenger and other system participants by facilitating transactions and information flow.

SUMMARY OF THE INVENTION

According to a preferred embodiment of the present invention, a system and method are provided to track both passengers and their baggage during their trip. A passenger trip record (PTR) is generated and recorded in an integrated travel information system (ITIS). The PTR identifies the passenger or passengers, an overall trip starting location, intermediate mode transfer points (e.g. airports), the final trip destination, the passenger's carry-on and checked bags, and other trip information, including billing information. The PTR also contains data linked with the passenger records (PNRs) associated with individual trip segments and vehicle operators. Each passenger has a unique passenger identification code (PIC) that is pre-registered in the ITIS with associated billing authorization, and each bag has a bag identification code (BIC) that is pre-registered in the ITIS. The bag pre-registration includes information on the bag owner and/or passenger, the bag description (e.g., a bag name provided by the passenger and/or owner) and manufacturer's serial number, and the radio frequency identification (i.e., RF ID) code for the bag. The overall trip starting location (origin) is defined to begin at the passenger's point of entry into the first vehicle used in the trip, such as a ground transportation vehicle (GTV). At the trip start, the PIC and associated bag BICs are wirelessly registered and transmitted to the ITIS using a wireless electronic device (WED) and a transponder, both preferably contained in the GTV. The PIC and the BICs are entered into the PTR in the computer database of the ITIS. The ITIS thereafter is updated to contain the latest information on the location of the passenger and trackable baggage set and additional relevant information on the passenger trip, including billing information and information concerning the on-time nature of the trip and if any delays or mishandled baggage have occurred.

The passenger or vehicle operator inputs the PICs and BICs remotely using the WED at the start of the trip. The WED signal is transmitted directly to an ITIS antenna or relayed via other communication means used in the ITIS, to transfer both the PICs and BICs to the ITIS database. When a satellite is used as the communication means, the satellite relays the signal to a remote antenna in communication with the ITIS computer. In a preferred mode of operation, upon arrival at the first mode transfer terminal (e.g. airport terminal building), the passenger leaves the GTV and enters the terminal. The GTV continues to convey the trackable baggage set to a baggage drop-off location located either within the terminal or nearby. In another preferred mode of operation (e.g. passenger driven GTV), the GTV drops the bags at a drop-off location and the GTV is then parked or departs from the transfer terminal. Each of the bags in the trackable baggage set are trackable by the ITIS.

The trackable baggage set is correlated to the passenger using the BICs and PICs in the PTR trip record created for the trip and stored in the ITIS database. When both the trackable baggage set and the passenger are aboard the next vehicle at the transfer terminal, the ITIS is capable of identifying that a boarded passenger is matched with each piece of boarded trackable baggage on the vehicle. A missing piece or pieces of a passenger's trackable baggage set can be located and routed to the vehicle before departure or identified for later delivery to the passenger's destination. Any additional baggage not matched with a passenger PIC will create an ITIS alert. At this point and at all other passenger and bag processing points in the trip, the ITIS records any appropriate billing information, and provides data to the passenger and vehicle operator when requested.

At the next mode transfer terminal (e.g. destination airport), the ITIS provides information on the matched PICs and BICs to a second ground transportation vehicle (GTV2) which is identified by the ITIS. In a preferred mode of operation, the GTV2 is directed to a pickup point for the trackable baggage set in an area adjacent to the arrival area of the mode transfer terminal. The passenger queries the ITIS via a portable WED, or through an ITIS access device provided for this purpose in the arrival area of the transfer terminal, and identifies the pickup location of the GTV2 and the passenger's trackable baggage set. The ITIS can also inform the passenger by the WED device of any missing or misdirected baggage. In other modes of operation, (e.g. passenger driven GTV2), the passenger enters the GTV2 and the GTV2 then moves to the baggage pickup location. Upon leaving the vicinity of the mode transfer terminal, the ITIS remotely identifies that the passenger and the passenger's trackable baggage set are located together in the transportation vehicle by a transponder located in the GTV2. In another preferred mode of operation, a fixed transponder receives the PICs and logs the BICs into the ITIS, indicating that the passenger has collected the bags and completed their ITIS trip.

Upon reaching a final destination point or an end of the trip, in the preferred mode of operation, the passenger transmits an end-of-trip signal to the ITIS using the GTV2 transponder and WED, or by other method. The end of trip signal notifies the ITIS that both the passenger and baggage set are together and have arrived at the final destination point. Billing information associated with the trip is also finalized, recorded, and reported.

In a preferred embodiment, the ITIS is wirelessly linked to a plurality of pickup locations using individualized pickup location codes (PLCs) for each of the pickup areas. Each ground transportation vehicle used for the ITIS also includes a unique vehicle identification number (VIN) to assist the ITIS in locating both the ground transportation vehicle and the pickup location, and directing the ground transportation vehicle to the pickup location. In a preferred mode of operation, the passenger therefore does not recover the trackable baggage set in the transfer terminal, but is directed by the ITIS to a nearby pickup location wherein both the ground transportation vehicle and the passenger's trackable baggage set are located. Congestion at the terminal, billing processing time, and passenger trip time are all reduced by the system of the present invention.

The present invention also applies to the carry-on bags carried with the passenger throughout the trip. The WED device allows the ITIS to track both the passenger and the carry-on bags through the mode transfer terminal, through primary security, and to the departure point for the next vehicle (e.g. aircraft departure gate).

Further areas of applicability of the present invention will become apparent from the detailed description provided hereinafter. It should be understood that the detailed description and specific examples, while indicating the preferred embodiments of the invention, are intended for purposes of illustration only and are intended neither to limit the scope of the invention nor to limit its applicability to a single mode of transportation

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
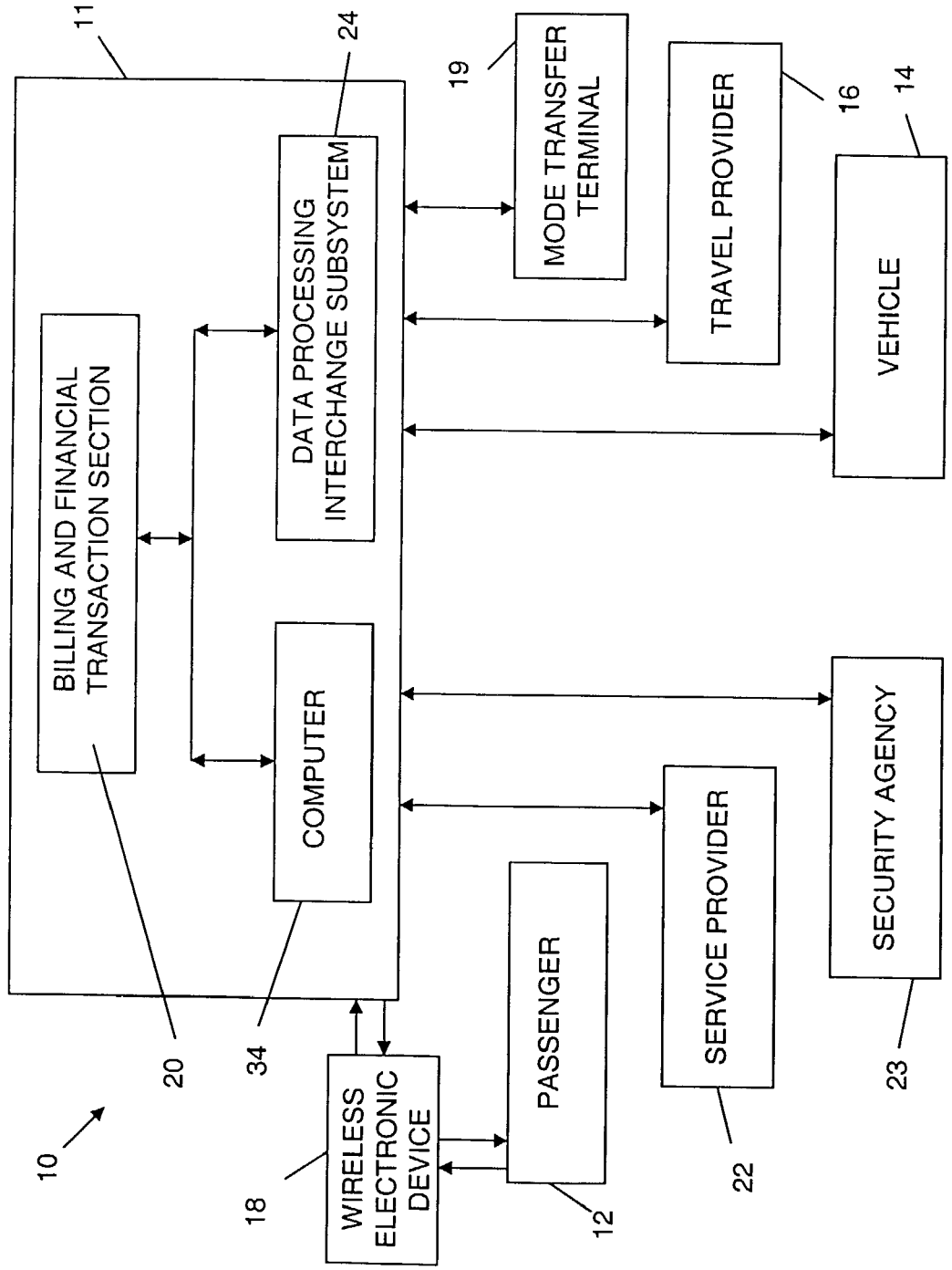
FIG. 1 is a block diagram showing an overview of the entities that interact within the integrated travel information system of the present invention, and the information flow paths (including billing information) between these entities, including sensors, data storage and processing, and communications devices.

Referring to FIG. 1, there is shown an integrated travel information system (ITIS) 10 formed by linking a central information system 11 along a plurality of information transfer paths to a plurality of related components of a passenger trip. A passenger trip is initiated by entering data into the ITIS 10 by a passenger 12 and/or by an operator of a vehicle 14. In a preferred mode of operation, the passenger 12 makes a complete trip itinerary request for a plurality of travel providers 16 using for example a wireless electronic device (WED) 18 to the central information system 11 of the ITIS 10. In another preferred mode of operation, the WED can be replaced by other communications methods such as a computer or a telephone. Using the central information system 11, the ITIS 10 then searches available trip segments through the plurality of travel providers 16 and vehicles 14 to check availability and pricing, and offers alternative itineraries to the passenger 12. The passenger 12 then selects the preferred trip itinerary and pricing. The travel provider 16 for each segment of the trip then provides a confirmed reservation for their segment of the trip to the passenger, and/or negotiate with the passenger to refine the trip itinerary request.

The confirmed reservations for each segment are entered into the central information system 11 of the ITIS 10 by the travel providers 16, and become part of an overall passenger trip record (PTR) that includes individual segment reservations to mode transfer terminals 19 confirmed by each travel provider 16. In another preferred mode of operation, the passenger 12 makes individual trip segment requests to one or more travel providers 16, and the ITIS 10 performs selected elements of the above-described process in response to passenger 12 and travel provider 16 requests.

The central information system 11 of the ITIS 10 also includes a billing and financial transaction section 20. The ITIS 10, through the billing and financial transaction section 20, communicates with a travel provider 16 or a service provider 22 to collect from the passenger 12 the fare for each pre-paid or post-paid segment of the trip or charge for each service and pass it on to the travel provider 16 or service provider 22, as agreed between the passenger 12 and either the travel provider 16 or service provider 22. Through the central information system 11, the ITIS 10 can also communicate with at least one security agency 23, including airport and airline security, local and national law enforcement, etc., to identify and/or communicate passenger and bag data including missing, stolen or tampered bags. A data processing/interchange subsystem 24 is contained within the central information system 11 of the ITIS 10, permitting communication between the central information system 11 of the ITIS 10 and the vehicles 14, travel providers 16, mode transfer terminals 19, a plurality of businesses, travel agencies, and other goods and service providers 22, and security agencies 23. An ITIS computer (shown and described in reference to FIG. 2) is also provided in the central information system 11 of the ITIS 10.

Figure 2:
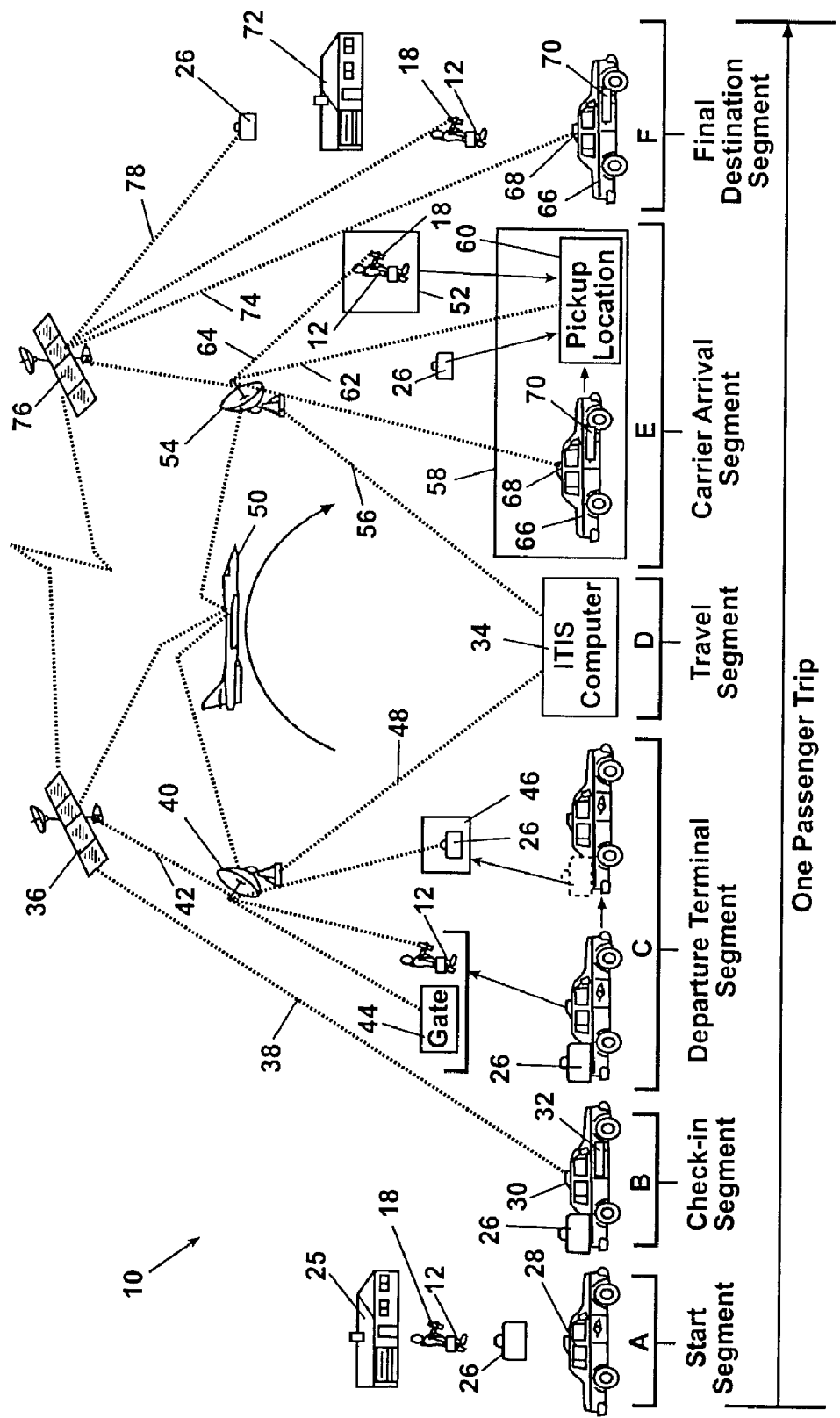
FIG. 2 is a block diagram showing a preferred embodiment of the integrated travel information system of the present invention, illustrated for a trip that includes both ground and air travel.

Referring to FIG. 2, a managed sequence of events implementing the integrated travel information system 10 according to a preferred embodiment of the present invention is shown for an exemplary trip that includes both ground and air travel. A single passenger trip is broken down into six segments labeled A through F respectively. In the initial trip segment A, a passenger 12 begins a trip at a trip origin location 25. The passenger 12 carries a trackable baggage set 26 and optionally the WED 18. As defined herein, a passenger trip includes in part transportation from the trip origin location to the mode transfer terminal. A ground transportation vehicle (GTV) 28 carries the passenger 12 and the trackable baggage set 26.

In a check-in segment B, the passenger 12 and the trackable baggage set 26 are in the GTV 28. The GTV 28 is wirelessly linked into the ITIS 10 through a transponder 30 in communication with a vehicle WED 32. In a preferred embodiment the passenger 12 uses the vehicle WED 32 to enter a set of passenger data including a passenger identification code and a baggage identification code. The set of passenger data is wirelessly transmitted into the ITIS 10 from the transponder 30. The set of passenger data is then loaded into an ITIS computer 34. The passenger trip record is updated in a database of the ITIS computer 34 to reflect the current status of passengers, baggage, and billing information. After receiving the passenger identification code, the ITIS 10 queries the passenger 12 for a quantity and code for baggage. The passenger 12 responds by entering the baggage identification information which is stored in the ITIS 10 as a baggage identification code (BIC), and the ITIS 10 matches the information with that provided at the trip origin location 25, or other location.

In another preferred embodiment, the WED 18 is a wireless portable telephone or other wireless device that wirelessly communicates with the ITIS 10. In still another preferred embodiment, the passenger 12 enters baggage data into the vehicle WED 32 using a "smart card" in place of the WED 18. The smart card is carried by the passenger 12, and is used similar to a credit card and swiped into the vehicle WED 32 or by using a WED device embedded in the smart card.

The set of passenger data entered by the passenger 12 using the vehicle WED 32 (or using the WED 18) is preferably directly transmitted into the ITIS 10. If direct wireless transmission is not available, the set of passenger data is wirelessly relayed to a satellite 36 or other remote communication system via a signal path 38. From the satellite 36 the signal is wirelessly transmitted to an ITIS antenna 40 over a satellite-to-ground signal path 42.

At a departure terminal segment C, the GTV 28 discharges the passenger 12 at a transfer terminal 44. The passenger 12 is security screened at the vehicle departure point (e.g. gate). The GTV 28 continues to transport the trackable baggage set 26 to a baggage drop-off area 46. The passenger 12 is therefore not required to physically bring the trackable baggage set 26 into the transfer terminal 44, which reduces congestion at the transfer terminal 44. Since the baggage code is already entered in the ITIS computer 34, the ITIS 10 is capable of "actively" tracking the trackable baggage set 26 when the GTV 28 approaches within a predetermined proximity range to the baggage drop-off area 46 as further discussed in reference to FIG. 8. Additional data is entered at the vehicle departure point by vehicle operator personnel. This data includes billing information and confirmation of the passenger 12 arrival and update data on the vehicle including departure/arrival times.

In another preferred mode of operation, the passenger may drop the check-in bags at the baggage drop-off area 46 before parking the GTV 28, or carry the bags into the transfer terminal 44.

In a carrier travel segment D, the data in the ITIS computer 34 is transmitted along a computer signal path 48 to a vehicle 50 (such as an aircraft in the exemplary) through the ITIS antenna 40 preferably by a direct antenna-to-aircraft path and optionally using the satellite 36 or other data communication system. Both the passenger 12 and the trackable baggage set 26 are loaded on the vehicle 50. The status of both the passenger 12 and the trackable baggage set 26 are continually relayed to the ITIS computer 34. The signal path during travel is from the vehicle 50 to the ITIS computer 34 via the satellite 36, and/or the ITIS antenna 40, or by other means of communication. The operators of the vehicle 50 can also access data from the ITIS computer 34 to confirm that each piece of boarded trackable baggage corresponds to one of the plurality of boarded passengers. The passenger 12 can confirm using the WED 18 or other communications device that all of the passengers' bags are on the vehicle 50.

At a mode transfer terminal segment E, (i.e., a carrier arrival segment), the vehicle 50 approaches a mode transfer terminal 52. Passenger data including the passenger identification code and the status of the trackable baggage set 26 are preferably downloaded through an ITIS antenna 54. The passenger data can also be sent via a satellite signal path or other means of communication. Upon arrival at the mode transfer terminal 52, the ITIS 10 correlates the location and status of the trackable baggage set 26. This correlation is initiated by the passenger 12 upon arrival at the mode transfer terminal 52 using the WED 18, or a carrier destination terminal WED (not shown), to signal the ITIS computer 34 of the passengers' arrival. The signal is received by the ITIS antenna 54 and relayed to the ITIS computer 34 via a computer signal path 56. The passenger 12 and the trackable baggage set 26 are preferably reunited close to the mode transfer terminal 52. In a preferred mode of operation, the ITIS 10 identifies a parking area 58 and selects a pickup location 60 using data collectable along a signal path 62 via the ITIS antenna 54. The ITIS 10 then signals the passenger 12 via a signal path 64 that the pickup location 60 contains the passengers' trackable baggage set 26. The signal path 64 communicates the pickup location 60 to either the WED 18 or to the transfer terminal WED (not shown).

The ITIS 10 also identifies an available ground transportation vehicle (GTV) 66 using a transponder 68 and a vehicle WED 70 provided on the GTV 66. In a preferred means of operation, the GTV 66 and/or the mode transfer terminal

(19) selects the pickup location 60 to receive the trackable baggage set 26. The GTV 66 then picks up the trackable baggage set 26 and proceeds to a nearby waiting point selected by the GTV driver, the passenger 12, or the ITIS 10. An antenna (not shown) at the pickup location 60 interrogates the codes of the trackable baggage set 26, and communicates the pickup location 60 to the ITIS database and on to the passenger 12. The passenger 12 proceeds to the pickup location 60 or a closer waiting point to meet the GTV 66 that contains the trackable baggage set 26. The passenger 12 boards the GTV 66 and together with the trackable baggage set 26 departs from the pickup location 60 or the waiting point. The ITIS 10 actively tracks the GTV 66 and the trackable baggage set 26 up to the proximity range of the ITIS 10 at the waiting point and in the mode transfer terminal 52.

In a final destination segment F, a final destination point 72 is reached by the passenger 12, the GTV 66, and the trackable baggage set 26. At the final destination point 72, the passenger 12 and/or GTV operator uses the transponder 68 and the vehicle WED 70 (or alternatively the WED 18) to wirelessly signal the ITIS 10 via a signal path 74 that the passenger 12 and the trackable baggage set 26 have arrived at the final destination point 72 (with appropriate billing information). Via a return signal off a satellite 76 or the satellite 36 if the satellite 36 is in range) along a signal path 78 or by other means of communication, the ITIS 10 confirms that the trackable baggage set 26 and the GTV 66 have arrived at the final destination point 72. The data in the ITIS computer 34 for this passenger trip is thereafter removed from the active trip area of the database in preparation for another passenger trip.

Figure 3:
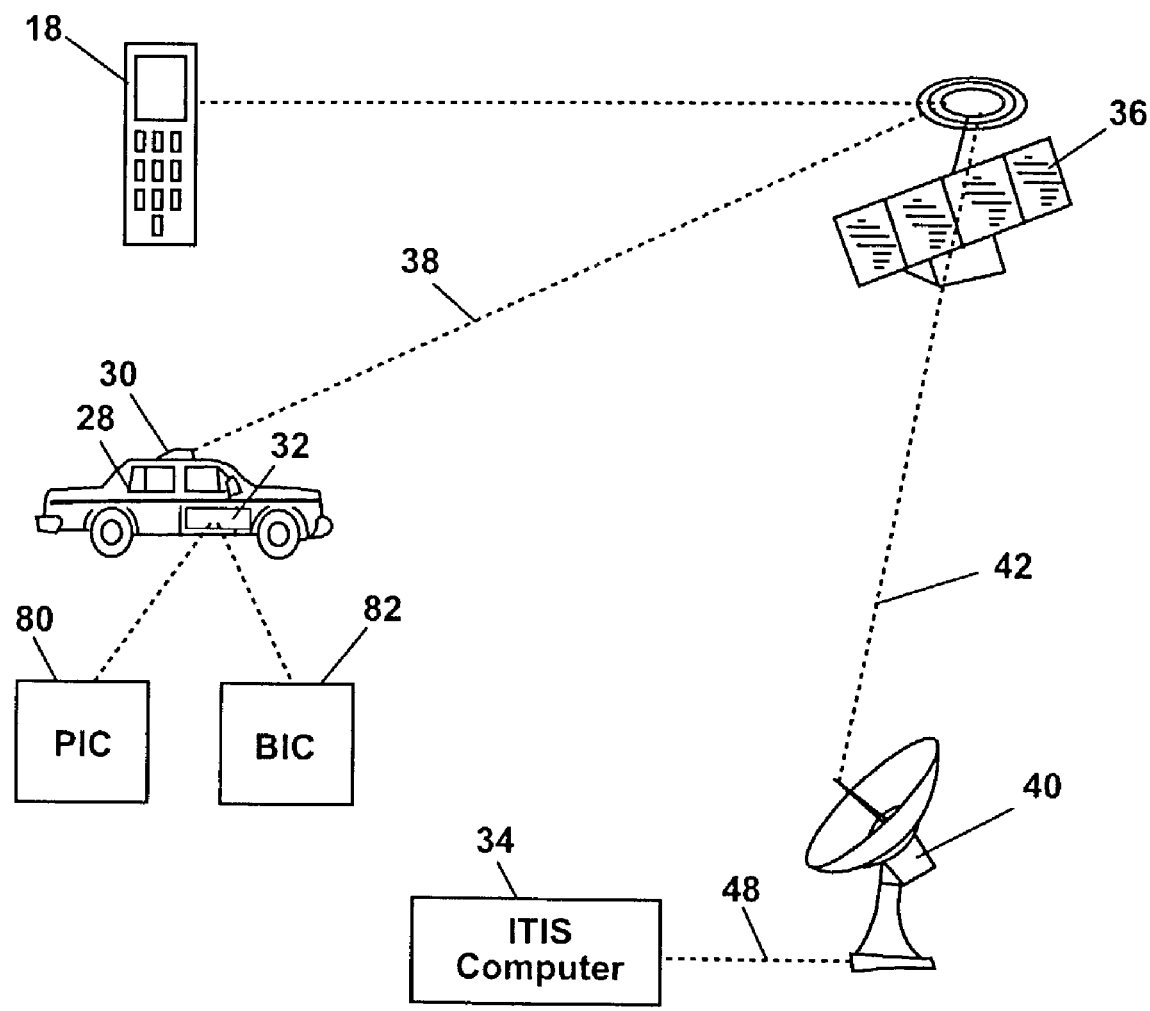
FIG. 3 is a perspective view identifying the electronic equipment and wireless data paths for entering a passenger identification code and a trackable baggage set baggage identification code into the integrated travel information system of the present invention, illustrated for a trip that includes satellite communications.

Referring now to FIG. 3, the remote check-in segment B of the passenger trip shown in FIG. 2 is identified in greater detail. Both a personal identification code (PIC) 80 and a baggage identification code (BIC) 82 are preferably entered into the vehicle WED 32 (or alternately via the WED 18). The PIC 80 and the BIC 82 are then transmitted by the transponder 30 into the ITIS computer 34 as previously discussed using the satellite 36 via the signal path 38 to the ITIS antenna 40 via the satellite-to-ground signal path 42, or by other means of communication. From the ITIS antenna 40, the data is transferred to the ITIS computer 34 along the computer signal path 48. If the vehicle WED 32 is within a direct signal path proximity to the ITIS antenna 40, the signal from the vehicle WED 32 can also be directly sent to the ITIS antenna 40 bypassing the satellite 36 (not shown). The PIC 80 is a unique identification number that is either pre-registered in the ITIS database or assigned by a vehicle operator to the passenger 12 when the passenger 12 initializes a trip with the vehicle operator (e.g. airline), creating a passenger trip record with preferred itinerary and other information. When the passenger 12 enters the PIC 80 into the ITIS 10, the ITIS computer 34 relays back to the vehicle WED 32 a request for information concerning passenger baggage.

In response to this request for passenger baggage information, the BIC 82 for each bag is entered, either automatically or by the passenger 12 or vehicle operator. The BICs 82 are a set of unique numbers assigned to each piece of the trackable baggage set 26 and pre-registered with the ITIS 10. In a preferred embodiment of the present invention, each piece of the trackable baggage set 26 will have a unique identification number. The ITIS 10 thereafter correlates each piece of the trackable baggage set 26 to the passenger using the PIC 80. In this preferred embodiment, the ITIS 10 requires that each piece of the trackable baggage set 26 be remotely identifiable by the ITIS 10.

Figure 4:
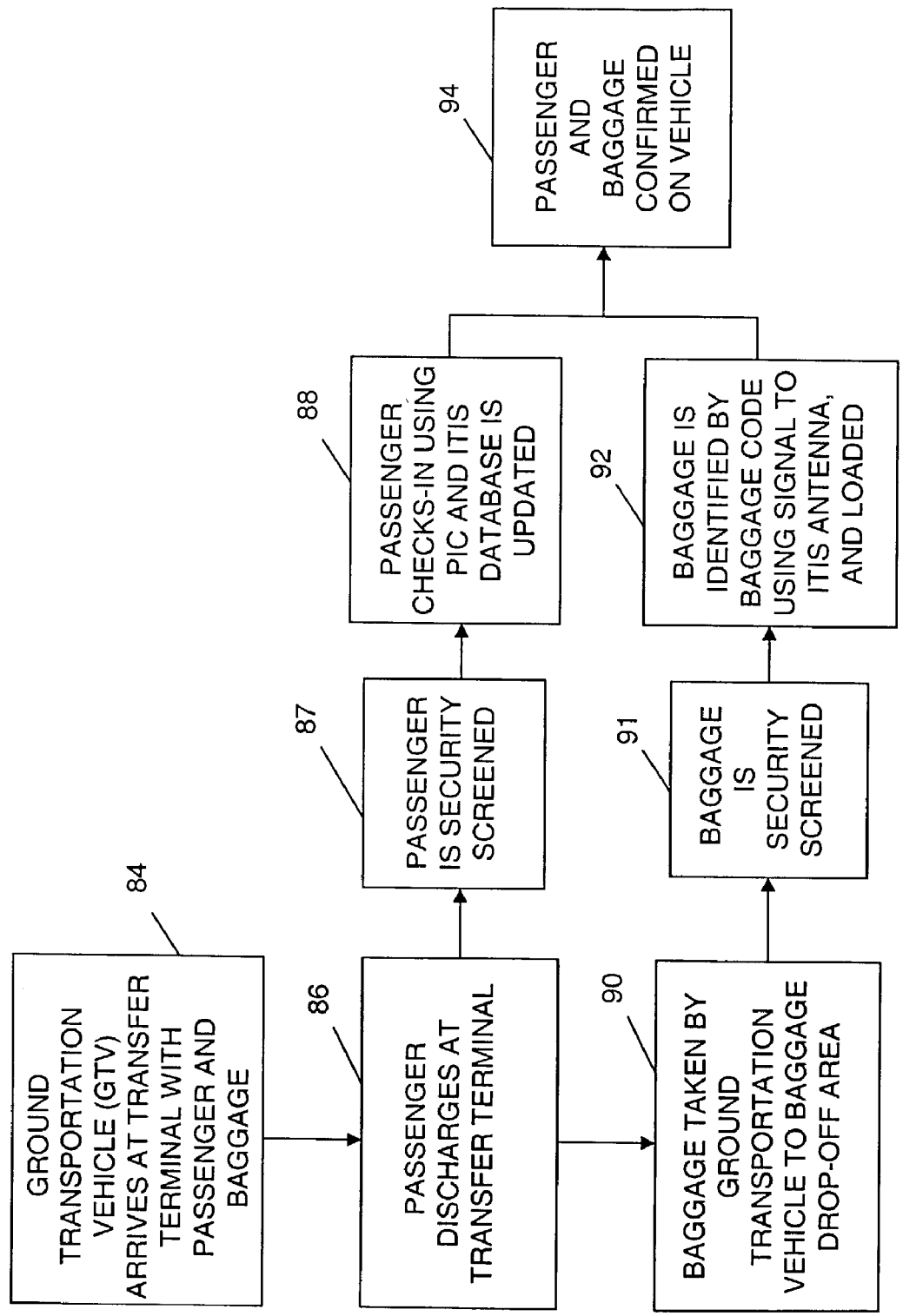
FIG. 4 is a block diagram identifying the steps used by the ITIS of the present invention to check-in both the passenger and the baggage set at a departure terminal.

Referring to FIG. 4, the passenger arrival steps of the departure terminal segment C (shown in FIG. 2) are further detailed. At a step 84, the ground transportation vehicle arrives at the departure terminal with both the passenger and the passenger's baggage. In the preferred mode of operation, at step 86, the passenger leaves the GTV at the transfer terminal. At a step 87, the passenger and carry-on baggage are security screened in the transfer terminal using the PIC 80 and the BICs 82. At a step 88, the passenger checks in at the departure point using the PIC 80, and the ITIS 10 updates the original check-in data with the information that the passenger is checked in at the departure point. At a dropping-off step 90, the baggage which was checked in previously (and which remained in the ground transportation vehicle after the passenger leaves the GTV) is taken by the ground transportation vehicle to a nearby baggage drop off area and dropped off. At a step 91, the checked baggage that was dropped off in step 90 is security screened, using the PIC 80 and the BIC 82 as references. At an identification and loading step 92, each piece of the trackable baggage set is identified by its baggage code transmitted to the ITIS 10. The status of each piece of the trackable baggage set is updated in the ITIS database and the baggage is loaded onto the vehicle for the next trip segment of the passenger. In a confirming step 94, both the passenger and each piece of the trackable baggage set are confirmed boarded on the vehicle. The vehicle operator is capable of correlating the boarded status of each piece of the baggage set to a boarded passenger using the ITIS and is therefore able to confirm that all the passengers' baggage is boarded on the vehicle.

Figure 5:
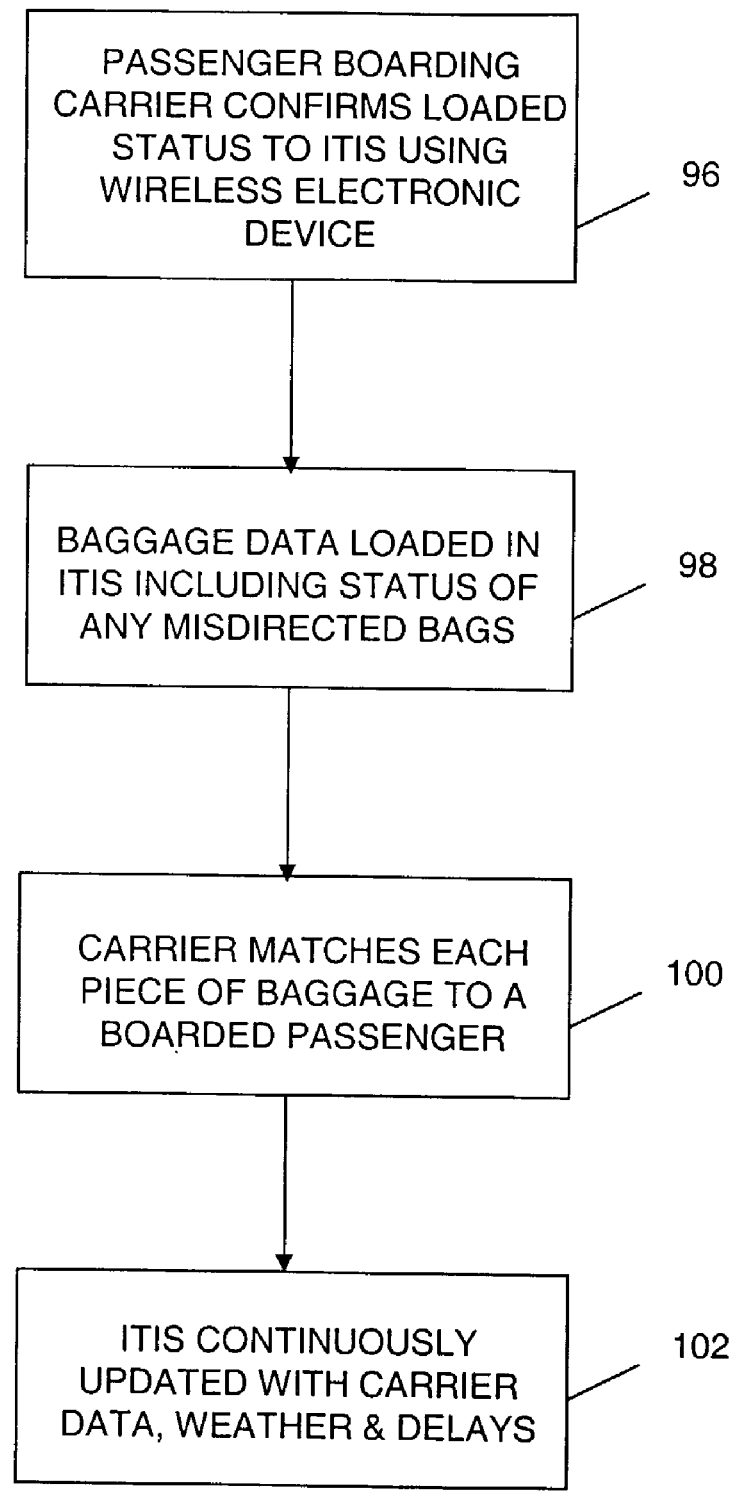
FIG. 5 is a block diagram identifying the steps the ITIS of the present invention uses to track both a passenger and the passenger baggage set during the travel phase between carrier terminals.

Referring to FIG. 5, the steps confirming both passenger and baggage loading on the vehicle are further detailed. At a confirming step 96, the integrated travel information system is informed that the passenger is aboard the vehicle (by automatic tracking, by the vehicle operator entering a passenger boarded status, and/or by the passenger using a portable wireless electronic device). At a loading step 98, after confirming with the baggage codes that each piece of the trackable baggage set belonging to the passenger is loaded on the vehicle, the status of all baggage is transmitted to the vehicle operator. The status of any misdirected, extra, or missing bags from the trackable baggage set is also available at this time. At a matching step 100, the vehicle operator matches each piece of the trackable baggage set to a boarded passenger on the vehicle. This capability also provides an additional security enhancement to the vehicle operator in that only those pieces of baggage previously correlated to the passengers onboard the vehicle are loaded onto the vehicle (plus any other vehicle operator approved and screened packages such as freight, mail, and company material). This capability identifies baggage pieces checked in at the transfer terminal where a corresponding passenger is not aboard the vehicle. At an updating step 102, during the travel phase, the integrated travel information system is continually updated with vehicle operator data, billing information, weather information, and any delays in the system. The integrated travel information system of the present invention is therefore capable of identifying to the passenger en route any changes in information concerning a connection with the next vehicle, and the status of any missing or misdirected baggage.

Figure 6:
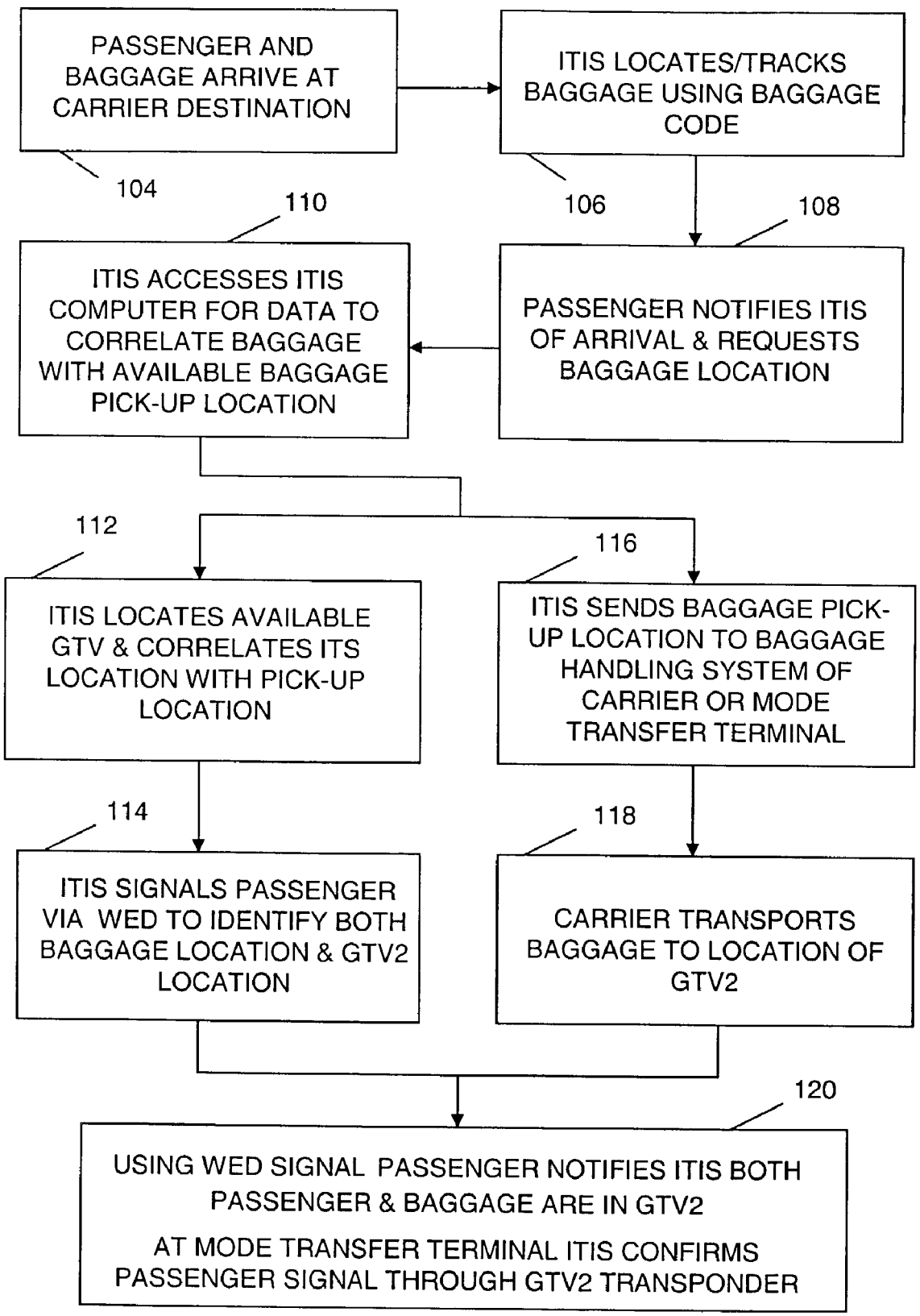
FIG. 6 is a block diagram identifying the steps conducted by the ITIS of the present invention at the end of an intermediate segment of the passenger trip.

Referring now to FIG. 6, the mode transfer terminal segment E (i.e., the carrier arrival segment shown in FIG. 2) is further identified in a sequence of steps. At an arrival step 104, the passenger and the trackable baggage set arrive at the mode transfer terminal. At a locating step 106, the ITIS 10 locates and tracks each piece of the trackable baggage set 26 using the baggage identification code stored in the ITIS computer 34. At a notification step 108, the ITIS 10 is notified of the passenger's arrival and provides the location of the trackable baggage set to the passenger 12. At a correlation step 110, the ITIS 10 accesses the ITIS computer 34 to retrieve data to correlate the trackable baggage set with an available baggage pickup location 60 at the mode transfer terminal 52. A plurality of baggage pickup locations are available, each having a unique location identification number. At a further correlation step 112, the ITIS 10 locates an available ground transportation vehicle 66 and correlates its location with the available baggage pickup location. Each ground transportation vehicle is tracked by the ITIS 10 using a unique vehicle identification number.

At a signal step 114, the ITIS 10 signals to the passenger the location of both the trackable baggage set and the ground transportation vehicle at the pickup location. At a parallel locating step 116, the ITIS 10 sends the baggage pickup location to the baggage handling system of the transfer terminal operator (e.g airport operator) or vehicle operator for the previous segment of the passenger's trip (e.g. airline). At a transportation step 118, the baggage handling system transports the trackable baggage set to the pickup location where the ground transportation vehicle is waiting or will arrive. Finally, in a preferred mode of operation, at a confirmation step 120, the ITIS 10 is notified when the passenger boards the ground transportation vehicle and confirms that the trackable baggage set is also aboard the ground transportation vehicle. The ITIS 10 sends a confirmation signal and continues to track each piece of the trackable baggage set until the ground transportation vehicle leaves the transfer terminal.

Figure 7:
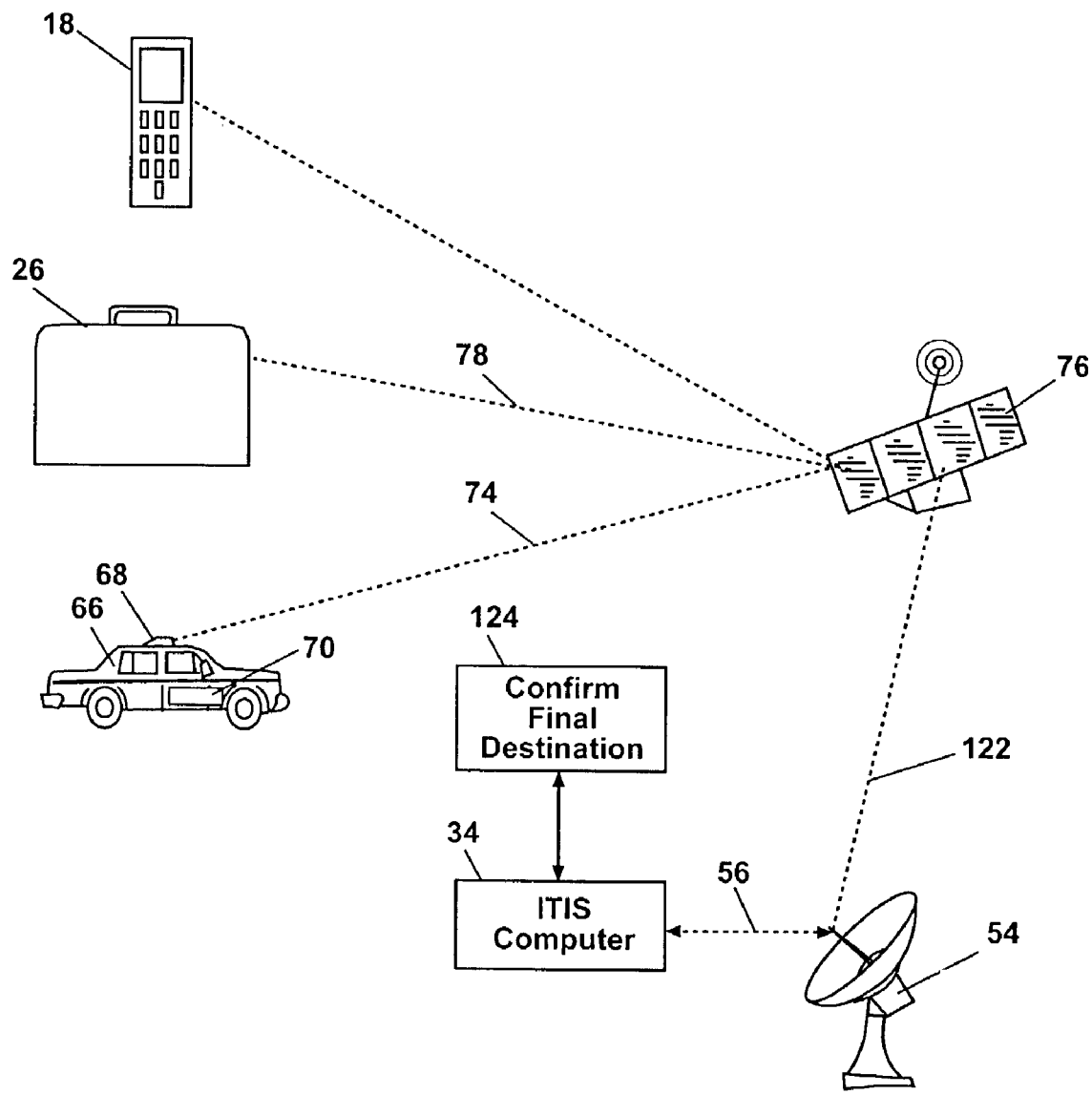
FIG. 7 is a perspective view identifying the electronic equipment and wireless data paths for entering a final destination code (and other information including billing information) into the ITIS and a return confirmation signal used by the ITIS.

Referring to FIG. 7, the wireless signal exchanges occurring at the passenger final destination segment F (shown in FIG. 2) are shown. Upon reaching the passenger's final destination point 72, the passenger 12 signals the ITIS 10 using the vehicle WED 70 or other device. Billing information for the GTV 66 is transmitted to the ITIS 10 to authorize payment by the passenger 12 to the ground transportation vehicle company. A final destination signal code is sent along a signal path 74 to the satellite 76 or other communication system. The satellite 76 or other communication system relays the final destination signal code along a signal path 122 to the ITIS antenna 54. From the ITIS antenna 54, the final destination code is sent to the ITIS computer 34 along the computer signal path 56. At this time the ITIS computer 34 runs a subroutine 124 which correlates the passenger 12 and the trackable baggage set 26 to the final destination signal code. The ITIS computer 34 returns a confirmation signal along the previously described signal paths to the vehicle WED 70 and also queries the status of the trackable baggage set 26 along the signal path 74 via the satellite 76 or other communication system. When correlation is complete, data for the passenger trip is removed from an active trip file of the ITIS 10.

Figure 8:
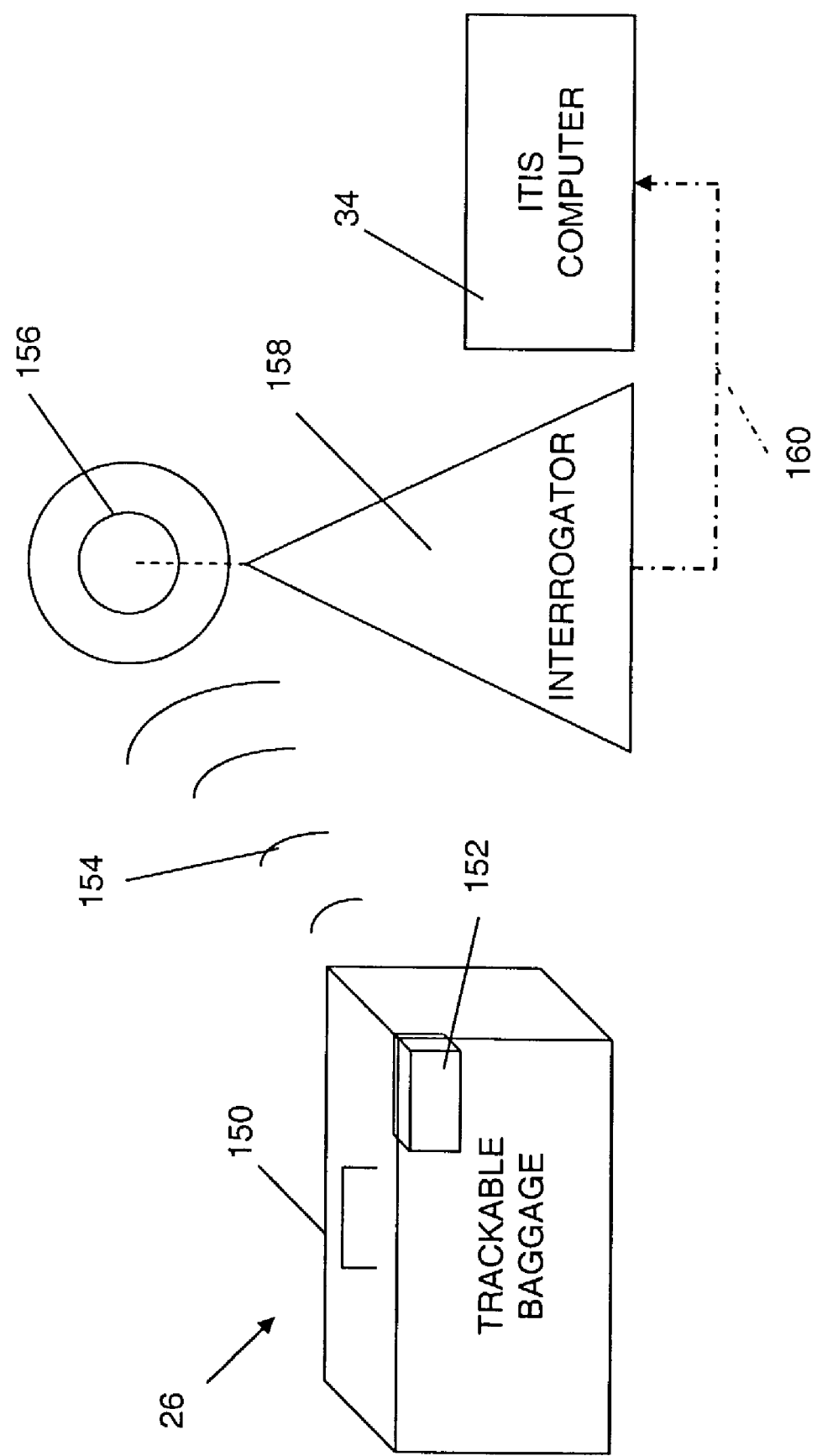
FIG. 8 is a perspective view of an exemplary trackable bag and system for tracking the trackable bag, with input to the ITIS computer of the present invention.

Referring to FIG. 8, an exemplary trackable baggage set 26, together with a system for both tracking the trackable baggage set 26 and reporting data to the ITIS computer 34 of the present invention is shown. In the exemplary embodiment shown, the trackable baggage set 26 includes a trackable bag 150. The trackable bag 150 includes a storage/transmission device 152. The storage/transmission device 152 stores the BIC 82 and provides the capability to transmit the BIC 82 either continuously, or in response to an electronic request to transmit the BIC 82. The BIC 82 is transmittable by a wireless transmission path 154 to an antenna 156 of one or more interrogator units 158 over a predetermined proximity range. In a preferred embodiment, the predetermined proximity range is based on a radio frequency signal having a range of approximately 1 yard (0.9 m) to approximately 150 yards (138.5 m). Each interrogator unit 158 is capable of sending and/or receiving electronic signals. A plurality of interrogator units 158 can be used to triangulate a position of the trackable bag 150. The BIC 82 is received and further transmitted to the ITIS computer 34 over a transmission path 160. One or more computers or data collecting units (not shown) can be included between the interrogator unit 158 and the ITIS computer 34 to provide correlation of the position of the trackable bag 150. The ITIS computer 34 receives the BIC 82 and location data from the one or more interrogator units 158.

FIG. 8 provides an exemplary embodiment of a system and method to identify and track a trackable baggage set 26. It should be understood that a plurality of systems and methods to track the trackable baggage set 26 and communicate data with the ITIS 10 of the present invention are possible. One such system and method is disclosed in copending United States Patent Application entitled "ELECTRONIC SYSTEM AND METHOD FOR BAGGAGE TRACKING AND IDENTIFICATION", Ser. No. 10/212,650, filed Aug. 5, 2002, which is herein incorporated by reference.

The integrated travel information system of the present invention offers several advantages. The passenger is no longer required to bring the baggage into the departure terminal or to recover the baggage from the carrier destination terminal. Remote check-in using a wireless system is available using the system of the present invention, therefore the passenger can check-in and the baggage can be checked-in before the passenger arrives at the terminal gate. This reduces the amount of time the passenger is required to spend at the terminal gate. The passenger can obtain updated information throughout the trip on the passenger's baggage and the status of future trip segments (e.g. flights). The vehicle operator (e.g. airline) can obtain information on passenger location and intent, and all parties can access billing information and perform financial transactions associated with the trip. By organizing a baggage drop off area remote from but nearby the transfer terminal area, the carrier can relieve the congestion at the terminal and more efficiently handle the volume of baggage. By using trackable baggage, the system of the present invention also provides improved security for the vehicle operators, transfer terminal operators, and for the passengers, by identifying the location and status of each passenger and piece of baggage during the entire trip.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method to track both passengers and passenger baggage during trip segments comprising the steps of:
   generating a passenger identification code, said passenger identification code identifiable with at least a passenger, a trip starting location, a transfer terminal, a carrier destination, and a passenger final destination;
   assigning a baggage identification code to each piece of baggage of a trackable baggage set;

remotely transmitting said passenger identification code and said baggage identification code to an integrated travel information system at said trip starting location by said passenger;

automatically locating both said passenger and said trackable baggage set to confirm both the passenger and said trackable baggage set are physically aboard a single mobile vehicle;

identifying to a carrier service any individual piece of baggage of said trackable baggage set not identified as aboard the single mobile vehicle together with said passenger;

designating a ground transportation vehicle at said transfer terminal for delivery of said trackable baggage set using said integrated travel information system;

directing said passenger to said ground transportation vehicle by said integrated travel information system; and transmitting an end-of-trip signal to said integrated travel information system by said passenger when both said passenger and said trackable baggage set arrive at said passenger final destination.

2. The method of claim 1, further comprising programming both a billing capability and a financial transactions capability into said integrated travel information system.

3. The method of claim 2, further comprising:

remotely transmitting said passenger identification code to said integrated travel information system using a wireless electronic device; and tracking both said passenger and said trackable baggage set using said integrated travel information system, said passenger identification code, and said baggage identification code.

4. The method of claim 3, further comprising assigning a unique identification number to said ground transportation vehicle.

5. The method of claim 4, further comprising:

storing said passenger identification code, said unique identification number, and said baggage identification code in a computer;

correlating said trackable baggage set to said carrier destination using said computer; and assigning said trackable baggage set to said ground transportation vehicle using said unique identification number.

6. The method of claim 5, further comprising:

identifying a passenger arrival at said transfer terminal to said integrated travel information system with said wireless electronic device; and signaling a baggage arrival at said transfer terminal from said integrated travel information system to said wireless electronic device.

7. The method of claim 6, further comprising:

routing said ground transportation vehicle to a predetermined passenger pickup location; and signaling said predetermined passenger pickup location to said passenger from said integrated travel information system to said wireless electronic device.

8. The method of claim 3, further comprising:

identifying a passenger arrival at said transfer terminal to said integrated travel information system with said wireless electronic device; and signaling a baggage arrival status at said transfer terminal from said integrated travel information system to said wireless electronic device.

9. The method of claim 2, further comprising:

programming said integrated travel information system with a data processing/interchange subsystem; and connecting said data processing/interchange subsystem with both said billing capability and said financial transaction capability for communication between said integrated travel information system and each of a plurality of businesses, vehicle agencies, vehicle operators, travel providers, transfer terminal operators, goods/services providers, and security agencies.

\* \* \* \* \*